(12) United States Patent
Denton, III et al.

(10) Patent No.: US 8,620,959 B1
(45) Date of Patent: *Dec. 31, 2013

(54) SYSTEM AND METHOD FOR CONSTRUCTING AND EDITING MULTI-MODELS

(75) Inventors: Leet E. Denton, III, Philadelphia, PA (US); Ramakrishnan Srinivasan, San Jose, CA (US); Kenneth Owens, Mount Laurel, NJ (US); Richard W. Buskens, Robbinsville, NJ (US); Edward Jones, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 408 days.

This patent is subject to a terminal disclaimer.

(21) Appl. No.: 12/873,434

(22) Filed: Sep. 1, 2010

Related U.S. Application Data (60) Provisional application No. 61/238,888, filed on Sep. 1, 2009.

(51) Int. Cl.
*G06F 17/30* (2006.01)
(52) U.S. Cl.
USPC .............................................. 707/796; 703/3
(58) Field of Classification Search
USPC ...................................... 707/796, 790; 703/3
See application file for complete search history.

(56) References Cited

U.S. PATENT DOCUMENTS

| | | | |
|---|---|---|---|
| 5,611,076 A * | 3/1997 | Durflinger et al. | 1/1 |
| 5,713,014 A * | 1/1998 | Durflinger et al. | 1/1 |
| 6,560,592 B1 | 5/2003 | Reid et al. | |
| 7,499,899 B2 | 3/2009 | Siegel et al. | |
| 2004/0015824 A1 | 1/2004 | Felkey et al. | |
| 2006/0168558 A1 * | 7/2006 | de Seabra e Melo et al. | 717/105 |
| 2009/0235227 A1 | 9/2009 | Hartman et al. | |

OTHER PUBLICATIONS

Hessellund, A., et al, "Guided Development with Multiple Domain-Specific Languages", Models 2007, pp. 1-15.
Greenfield, J., et al, "Software Factories", Wiley (2004), pp. 142-143, 568-569, 570-571.

(Continued)

*Primary Examiner* — John Breene
*Assistant Examiner* — Joshua Bullock
(74) *Attorney, Agent, or Firm* — Howard IP Law Group, P.C.

(57) ABSTRACT

A computer database system for multi-model integration includes remote client-side components and a multi-model database having a plurality of artifacts that define the multi-model database and a multi-model repository that holds the artifacts under version control. The remore client-side components include a multi-model manager, one or more connectors, execution automation engine, a sandbox, and a version control system client. The multi-model repository includes a plurality of models, wherein each model represents a discrete aspect of the system, a model registry containing a list of the models in the multi-model database, a set of input attributes and a set of output attributes corresponding to each of the models, a set of interfaces representing a tuple corresponding to each of the models, wherein said tuple contains a mapping operation and the input and output attributes, a set of attribute constraints associated with the input and output attributes, and a set of notifications associated with each of the models for informing the models of defined events.

8 Claims, 9 Drawing Sheets

(56) References Cited

OTHER PUBLICATIONS

Nuseibeh, B., et al, "A Framework for Expressing the Relationships Between Multiple Views in Requirements Specification", IEEE Transaction on Software Engineering, Oct. 1994, pp. 1-20.

Hardebolle, C., et al, "A Generic Execution Framework for Models of Computation", MOMPES 2007, IEEE Computer Society (Mar. 31, 2007).

Karsai, G., et al, "Design patterns for open tool integration", Software and Systems Modeling (2005), pp. 157-170.

Olveczky, P., et al, "Semantics and Pragmatics of Real-Time Maude", Higher-Order and Symbolic Computation (20) 1(2007) 1-35.

Brooks, C., et al, "Multimodeling: A Preliminary Case Study", Technical Report No. UCB/EECS-2008-7, EECS Department, University of California, Berkeley, (Jan. 17, 2008).

Zave, P., et al, "Where Do Operations Come From? A Multiparadigm Specification Technique", IEEE Transactions on Software Engineering, vol. 22, No. 7, Jul. 1996, pp. 508-528.

Girault, A., et al, "Hierarchical Finite State Machines with Multiple Concurrency Models", IEEE Transactions on Computer-Aided Design of Integrated Circuits and Systems, vol. 18, No. 6, Jun. 1999, pp. 742-760.

Steffen, B., et al, "The Electronic Tool Integration platform: concepts and design", International Journal on Software Tools for Technology Transfer (STTT) 1(1) (1997) 9-30.

Margaria, T., et al, "jETI: A Tool for Remote Tool Integration", TACAS (2005), LNCS 3440, pp. 557-562, 2005.

Wimmer, M. et al, "A Semi-automatic Approach for Bridging DSLs with UML", Proceedings of the 7th OOPSLA Workshop on Domain-Specific Modeling (2007).

Kappel, G., et al, "ModelCVS—A Semantic Infrastructure for Model-based Tool Integration", Technical report, Johannes Kepler University of Linz and Vienna University of Technology (2005), pp. 1-27.

Brauer, M., et al, "Towards Semantic Integration of Multiple Domain-Specific Languages Using Ontological Foundations", Proceedings of the 4th International Workshop on (Software) Language Engineering (ATEM) (2007).

\* cited by examiner

FIG. 2

MULTI-MODEL RESPOSITORY LAYOUT.

FIG. 3

ATTRIBUTES DIRECTORY RESPOSITORY LAYOUT.

FIG. 4

EXECUTION DIRECTORY RESPOSITORY LAYOUT.

FIG. 5

INTERFACES DIRECTORY RESPOSITORY LAYOUT.

FIG. 6

MODELS DIRECTORY RESPOSITORY LAYOUT.

FIG. 7

NOTIFICATIONS DIRECTORY RESPOSITORY LAYOUT.

FIG. 8

```
<?xml version="1.0"?>
<xs:schema xmlns:xs="http://www.w3.org/2001/XMLSchema"
targetNamespace="http://www.atl.lmco.com/naomi/attributes"
elementFormDefault="qualified">
    <xs : element  name="attribute">
        <xs : complexType>
            <xs : sequence>
                <xs : element  name="owner" type="xs : string" />
                <xs : element  name="value" type="xs : string" />
                <xs : element  name="units" type="xs : string" minOccurs="0"/>
                <xs : element  name="documentation" type="xs : string" minOccurs="0"/>
            </xs : sequence>
        </xs : complexType>
    </xs : element>
</xs : schema>
```

SIMPLE ATTRIBUTE SCHEMA ATTRIBUTE_SIMPLE.XSD.

FIG. 9

```
<?xml version="1.0"?>
<attribute  xmlns="http://www.atl.lmco.com/naomi/attributes"
xmlns:xsi="http://www.w3.org/2001/XMLSchema-instance"
xsi:schemaLocation="http://www.atl.lmco.com/naomi atttribute_simple.xsd">
    <owner>Excel:reliability_model.xml</owner>
    <value>1</value>
    <units>unknown</units>
    <documentation>created by naomi_excel_xml.pl</documentation>
</attribute>
```

SIMPLE ATTRIBUTE EXAMPLE XML FILE.

FIG. 10

```xml
<?xml version="1.0"?>
<xs:schema xmlns:xs="http://www.w3.org/2001/XMLSchema"
targetNamespace="http://www.atl.lmco.com/naomi/interfaces"
elementFormDefault="qualified">
    <xs : element  name="interface">
        <xs : complexType>
            <xs : sequence>
                <xs : element  name="name" type="xs : string" />
                <xs : element  name="type" type="xs : string" />
                <xs : element  name="input"  minOccurs="0" maxOccurs="unbounded">
                    <xs : complexType>
                        <xs : simpleContent>
                            <xs : extension base="xs:anyURI">
                                <xs : attribute  name="checksum" type="xs:string"/>
                            </xs :extension>
                        </xs : simpleContent>
                    </xs : complexType>
                </xs : element>
                <xs : element name="output"  minOccurs="0" maxOccurs="unbounded">
                    <xs : complexType>
                        <xs : simpleContent>
                            <xs :extension base="xs : anyURI">
                                <xs : attribute  name="checksum" type="xs:string"/>
                            </xs :extension>
                        </xs : simpleContent>
                    </xs : complexType>
                </xs : element>
            </xs :sequence>
        </xs : complexType>
    </xs : element>
</xs : schema>
```

*FIG. 11*

```xml
<?xml version="1.0"?>
<interface  xmlns="http://www.atl.lmco.com/naomi/interfaces"
xmlns:xsi="http://www.w3.org/2001/XMLSchema-instance"
xsi:schemaLocation="http://www.atl.lmco.com/naomi ../interface.xsd">
    <name>test</name>
    <type>Excel</type>
    <input>system.reliability</input>
    <output>carsignalling.checkpointing.frequency</output>
</interface>
```

*FIG. 12*

```
<?xml version="1.0"?>
<xs:schema xmlns:xs="http://www.w3.org/2001/XMLSchema"
targetNamespace="http://www.atl.lmco.com/naomi/models"
elementFormDefault="qualified">
    <xs : element   name="models">
        <xs : complexType>
            <xs : sequence>
                <!-- a single model -->
                <xs : element name="model" minOccurs="0" maxOccurs="unbounded">
                    <xs : complexType>
                        <xs : sequence>
                            <xs : element name="name" type="xs:string"/>
                            <xs : element name="type" type="xs:string"/>
                            <xs : element name="alias" type="xs:string"/>
                            <xs : element name="executable" type="xs:boolean"/>
                            <xs : element name="interface" type="xs:anyURI"/>
                        </xs : sequence>
                    </xs : complexType>
                </xs : element>
            </xs :sequence>
        </xs : complexType>
    </xs : element>
</xs : schema>
```

FIG. 13

```
<?xml version="1.0"?>
<models  xmlns="http://www.atl.lmco.com/naomi/models"
xmlns:xsi="http://www.w3.org/2001/XMLSchema-instance"
xsi:schemaLocation="http://www.atl.lmco.com/naomi/models naomi_models.xsd">
    <model>
        <name>test model</name>
        <type>Excel</type>
        <alias>test</alias>
        <interface>test/test_interface.xml</interface>
    </model>
    <model>
        <name>test model2</name>
        <type>Excel<type>
        <alias>test2</alias>
        <interface>test2/test2_interface.xml</interface>
    </model>
</models>
```

SYSTEM AND METHOD FOR CONSTRUCTING AND EDITING MULTI-MODELS

CROSS-REFERENCE TO RELATED APPLICATION

This application claims the benefit under 35 U.S.C. §119 (e) of U.S. Provisional Application Ser. No. 61/238,888 filed Sep. 1, 2009 the disclosure of which is incorporated herein by reference in its entirety.

FIELD OF THE INVENTION

This disclosure is generally related to modeling technology and more particularly related to data modeling of a multi-model representation of a product system.

BACKGROUND

In designing a product system, whether it be a computer system or other systems such as an aircraft, a ship, a missile, etc., incomplete product system design specifications can lead to serious problems that do not manifest themselves until very late in the product system development cycle—when the costs to repair such problems can be astronomical. Model-driven design techniques can expose design flaws early in the product system development cycle and minimize the cost of design change.

Invariably, multiple models are needed to comprehensively model all aspects of a product system under design, encompassing system structure and behavior, and possibly other aspects such as cost. However, general-purpose modeling languages lack the semantic precision required to model all aspects of a system. In order to capture domain-specific semantics, these general-purpose modeling languages may be extended with domain-specific extensions (e.g., the UML profile for Modeling and Analysis of Real-time and Embedded systems). Alternately, one could use Domain Specific Modeling Languages (DSMLs) that offer capabilities needed for the specific purpose—e.g., use MATLAB® for mathematical models or Simulink® for simulation models. In either case, no single modeling language can be rich enough to capture all aspects of a system under design.

Therefore, there is a need for model-centric systems engineering and development that does not require or depend on the existence of a single all-encompassing general-purpose model language. Multi-modeling, the use of multiple models, appears to be a better approach; however, the use of multiple models that deal with diverse aspects of the system under design presents several challenges such as data and semantic consistency.

SUMMARY

According to an embodiment of the present disclosure, a computer database system for multi-model integration is disclosed. The computer database system includes one or more remote client computers, each of the remote client computers having remote client-side components provided therein. The remote client-side components comprising a multi-model manager, one or more connectors, an execution automation engine, a sandbox, and a version control system client. The computer database system further comprising a server connected to the one or more remote client computers via a communication medium, wherein the server comprises a processing unit, and a data storage for storing a multi-model database of a product system and accessible by the processing unit. The multi-model database comprises a plurality of artifacts that define the multi-model database and a multi-model repository that holds said artifacts under version control. The artifacts comprise a models data dataset, wherein each model represents a discrete aspect of the product system, a model registry dataset containing a list of the models in the multi-model database, a model attributes dataset corresponding to each of the models, a model interfaces dataset representing a tuple corresponding to each of the models, wherein said tuple containing a mapping operation and said model attributes, a model attribute constraints dataset associated with the input and output attributes, wherein said attribute constraints are triggers on the value of the associated attribute, a model data editing tools dataset, a notifications dataset associated with each of the models for informing the models of defined events, and a multi-model execution control dataset.

The data model of the present disclosure allows for integration of a wide variety of modeling tools using a uniform representation of models and data model. The modelers can freely construct multiple models using a suite of diverse domain-specific modeling languages (DSMLs) where each DSML allows specific aspects of a system to be precisely modeled and interrelate the various models into a composition as a multi-model database.

A challenge then is the complexity of integrating the various models in a cohesive manner. The root causes of this challenge are the diversity of the various modeling paradigms in both specification and implementation, the need for these models to share information about the system under design, and the need for model changes to be appropriately reflected in dependent models.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein.

All drawings are schematic and are not intended to show any dimensions to scale.

DETAILED DESCRIPTION

This description of the preferred embodiments is intended to be read in conjunction with the accompanying drawings, which are to be considered part of the entire written description of this invention.

Figure 1:
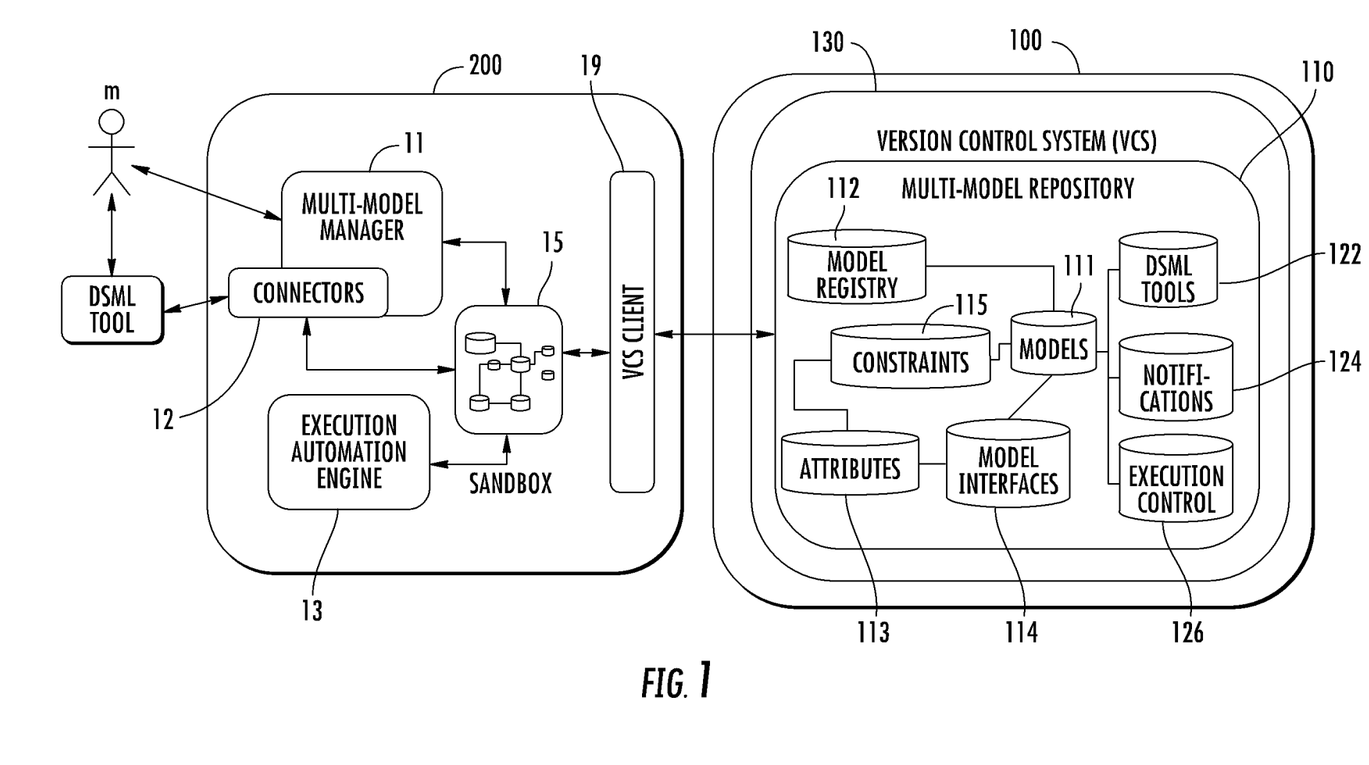
FIG. 1 is a schematic representation showing a high level overview of the platform for multi-model integration according to an embodiment of the present disclosure.

FIG. 1 shows a high level schematic overview of a multi-modeling integration platform P for multi-model integration according to an embodiment of the present disclosure. The multi-modeling integration platform P places no restrictions on the modeling languages or tools that may be used to develop a multi-model of a system. The multi-modeling integration platform P allows modelers m to specify the models used to describe a system, along with the inter-dependencies of the models, and uses this information to propagate changes made to one model in the multi-model to all dependent models. The multi-modeling integration platform P comprises a multi-model database 100 implemented on a computer system 30 (see FIG. 15) and remote client-side components 200 implemented on one or more remote client computers $10_{(1)} \ldots 10_{(n)}$.

The multi-modeling integration platform P allows a consistent multi-model to be maintained. In this disclosure, consistent multi-model refers to a multi-model of a system, in which, preferably there are no unpropagated model changes. Thus, when a model in a consistent multi-model system is modified, the changes made to the model are correctly propagated to associated dependent models. Such changes may propagate through the entire set of models in the multi-model and may propagate back to the originally modified model itself. When the propagated changes converge to the point where no more change propagation is necessary, the multi-model has again achieved consistent state. To reach multi-model consistency, the changes to a constituent model must be propagated in order, with respect to their interdependencies. However, it may be difficult to determine such an ordering when the dependencies are cyclic. For example, where changes to Model A results in changes to Model B, which results in changes to Model C, which in turn results in further changes to Model A, thus completing a cycle. Even if a suitable ordering of change propagation can be determined, there is no way today to assess if the models will converge. Our approach to this problem consists of automatically constructing an Execution Plan (described further below), which is an ordered list of model execution steps. When cycles are detected, a user-specified convergence criteria based on (i) number of steps, (ii) accuracy, or (iii) a combination of both are used.

The multi-model database 100 according to a preferred embodiment of the present disclosure is constructed from models data dataset 111 for a plurality of constituent models using DSMLs and can represent a wide variety of modeling paradigms. The multi-model database 100 can be constructed by treating each of the constituent models data 111 as black boxes that can operate with a set of data items as inputs and produce a set of data items as outputs.

The multi-model database 100 is comprised of various entities or datasets. We use the term artifacts to describe these datasets that define the overall multi-model database 100. These artifacts include a model registry dataset 112, the constituent models data dataset 111, model interfaces dataset 114, model attributes dataset 113, model attribute constraints dataset 115, model data editing tools dataset 122 (e.g. DSML tools), notifications dataset 124, and multi-model execution control dataset 126. All of the datasets are stored in a multi-model repository 110 which is preferably version controlled using a version control system 130. This allows the entire multi-model database 100 to be reconstructed at any point during the evolution and for distributed collaboration via modifications to the datasets in the multi-model repository 110.

The model registry dataset 112 is used to determine membership in the multi-model database 100. The model registry dataset 112 is a list of a plurality of constituent DSML models that are participating in the multi-model. If a constituent model is removed from the model registry dataset 112, the artifacts that correspond to that model remain in the multi-model repository 110, but that model will not participate in the multi-model. Each entry in the model registry dataset 112 is a proxy for a corresponding models data dataset 111. The models data dataset 111 comprises the plurality of the DSML models and is stored in whatever format the model data editing tools dataset 122 choose to maintain the data. Although not required, by storing the models data dataset 111 and model editing tools dataset 122 in the multi-model repository 110, a more complete set of operations is possible.

In our notion of models, they can be grouped into two not necessarily exclusive groups, Specification and Analytical models. Specification models help to define the system being modeled, for example UML may define the class hierarchy, valid system states or operational sequence diagrams. Analytical models, analyze aspects of the defined system. Our multi-model management platform must consider an important aspect of these model types, namely, whether the models are executable or not. Typically, but not always, an Analytical model is executable; whereas a Specification model is not executable. An executable model is defined as a model that changes its outputs based on its inputs each time it is 'executed'. A Microsoft Excel spreadsheet that embeds a formula, which uses an external input, is an example of an Analytical model which is executable. A Microsoft Word or PowerPoint document, on the other hand, that contains narrative design with parameters, is an example of Specification model, which is not executable. The executable nature of a model is important when determining model dependencies, execution plans and propagating model changes.

Each of the constituent models in the models dataset 111 can be considered as essentially a mapping operation written in a modeling language, $L_i$, over a set of inputs, that produces a set of outputs. A model, is associated with a set of attributes that are inputs $I_j=\{a_1, a_2, \ldots, a_n\}$, which may be empty, and a set of attributes that are outputs $O_j=\{a'_1, a'_2, \ldots, a'_n\}$, which may also be empty. We can then represent the model, $M_j$ by the tuple $M_j(L_i, I_j, O_j)$ containing a mapping operation, $L_i$, and the set of input, $I_j$, output, $O_j$, model attributes. This tuple is the model interface data that the model exposes to the system by adding it to the model interface dataset 114 of the multi-model repository 110. A multi-model database 100, M, can then be defined as a set of models $M=\{M_1, M_2, \ldots, M_m\}$. To synchronize execution of the multi-model, we require that an attribute is owned by a single constituent model and can only be written by the model that owns it. That is, if $a_i \in O_j$, then $a_i \notin O_n \forall O_{n \neq j} \in M$.

The constituent models can have attribute constraints 115 associated with their inputs and outputs. These attribute constraints can be thought of as triggers on the value of the associated attribute. If a first constituent model has a constraint on input attribute $a_i$ associated with or owned by a second model, then the first model is notified when the second model that owns $a_i$ outputs a value that violates this constraint. Output constraints are used by a model to ensure that the attributes that are written are valid from the point of view of the model that writes them.

The model data editing tool dataset 122 are model-editing tools, or references to them, that correspond to the constituent models. For example, in the case of a MATLAB® model, the model data editing tool can be either the actual MATLAB® software, or a reference to the specific version of MATLAB® program used to create the model.

A set of notifications stored in the notifications dataset 124 are messages that are sent to the constituent models to inform them of occurrence of defined events. For example, when a modeler edits one of the plurality of DSML models which generates a change to an output attribute that violates some attribute constraint, a notification is sent to the affected models.

Multi-model execution control dataset 126 consists of multi-model execution plan, its modifications, and message queues. When a multi-model administrator, who maintains the multi-model repository 110, makes a change to the execution plan, the resulting plan and the changes are stored in these artifacts. Moreover, when the execution co-ordination engine orchestrates the execution, it needs to send and receive messages from the individual models. These artifacts also capture the queues containing those messages.

The multi-model database 100 incorporates a version control system 130, thus incorporating the commonly used basic version control system operations such as check-in, check-out and history examination into the multi-model repository 110. This can be realized by using a commonly available open source version control system, such as a Subversion repository. The use of a source code version control system such as Subversion enables versioning of models and their shared concepts (the model attributes dataset 113) so that exploration of the design space can be accomplished in a systematic and controlled manner.

The models data dataset 111 and their corresponding model data editing tools dataset 122 reside inside the multi-model repository 110 in their native forms. The multi-model repository 110 is managed by the version control system 130. Model interfaces dataset 114, attributes dataset 113, notifications dataset 124, and the model registry dataset 112 can be implemented as XML files, with defined XML schemas, stored inside the multi-model repository 110. Attribute constraints dataset 115 can be defined as XML schemas that impose a restriction on an attribute file. Every registered model is allowed one constraint schema per attribute, allowing each modeler to use a customized set of constraints. In this exemplary implementation, an XML schema validation engine can be used to validate each attribute against the associated constraints.

Although the embodiment of the multi-model database 100 shown in FIG. 1 is described in the context of multiple models for a computer system, the scope of the present disclosure is also applicable to other systems that a modeler m may design using one of the one or more remote client computers $10_{(1)} \ldots 10_{(n)}$. For example, a product system can be a glider with no computer system on it. The modeler m may design the glider using multiple models, e.g. an aerodynamic model, a reliability model, and a cost model, etc to help design the glider. The multiple models for the glider would be in the multi-model database 100 implemented on a computer system (see FIG. 15), although the system (the glider) being modeled is not a computer system.

Figure 2:
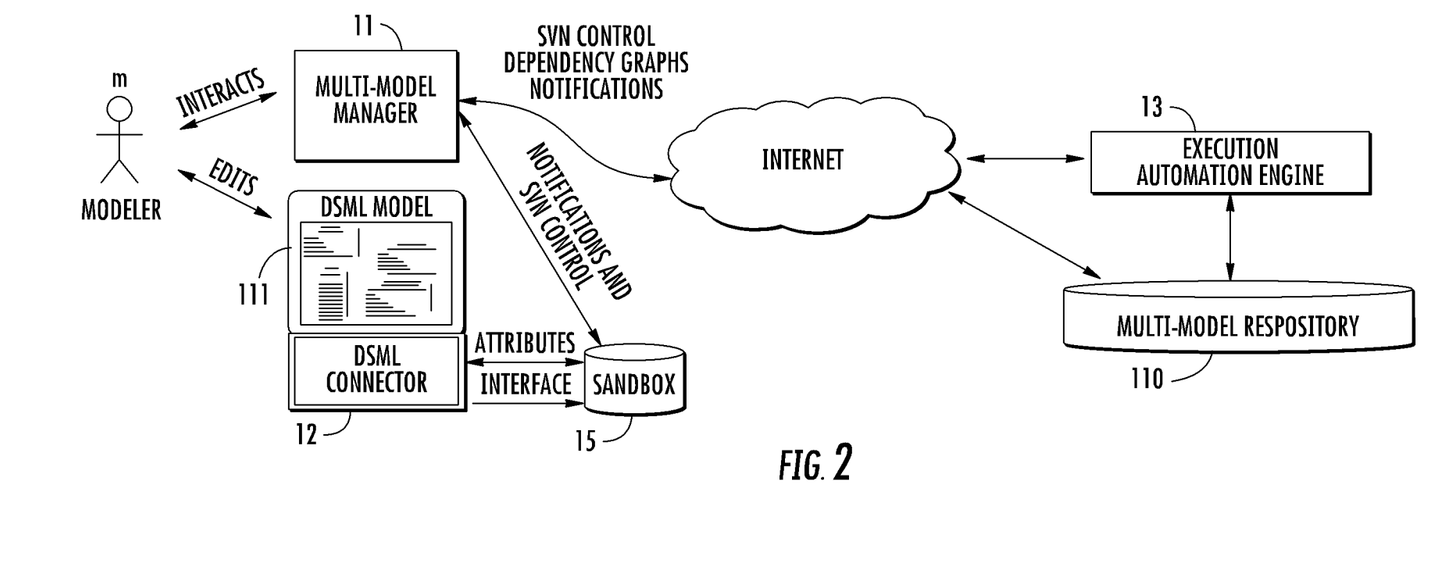
FIG. 2 is an overview of the workflow of the multi-model manager of the multi-model integration platform.

FIG. 2 shows an overview of the workflow in the implemented multi-modeling integration platform P. Modelers use their modeling tool to edit/modify the constituent models 111 (DSML models in the illustrated example). The multi-model manager 11 is then used to (i) invoke the DSML connectors 12, (ii) browse (i.e., navigate through and view the contents of) the local sandbox 15, and (iii) commit changes to the constituent models and other artifacts to the central multi-model repository 110. The execution automation engine 13 is then used to analyze the central multi-model repository 110 and prepare an execution plan, which is used to maintain multi-model consistency. The execution plan is a roadmap for ordered execution of models and is constructed by analyzing model dependencies. The ordered execution of the models leads to the correct propagation of changes through the various constituent models.

Figure 3:
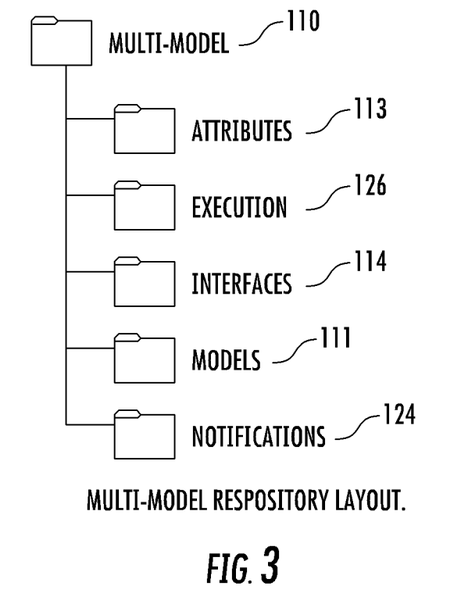
FIG. 3 is a graphic representation of the multi-model repository's layout.
Figure 6:
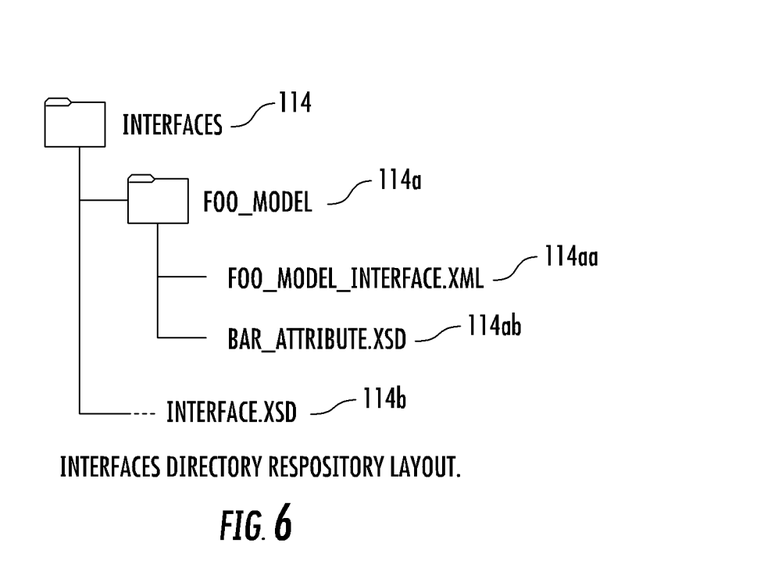
FIG. 6 is a graphic representation of the interfaces directory repository layout.
Figure 7:
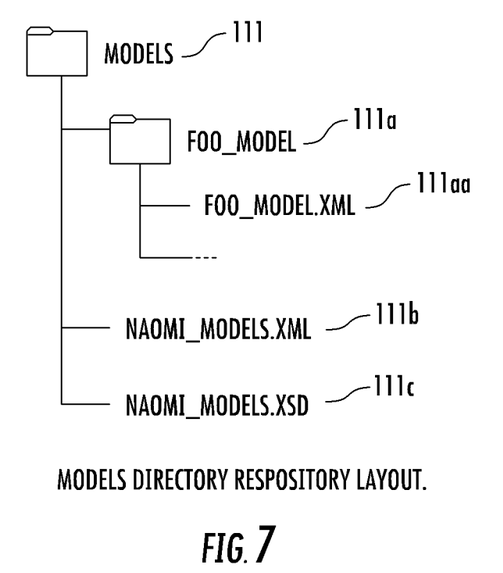
FIG. 7 is a graphic representation of the models directory repository layout.
Figure 8:
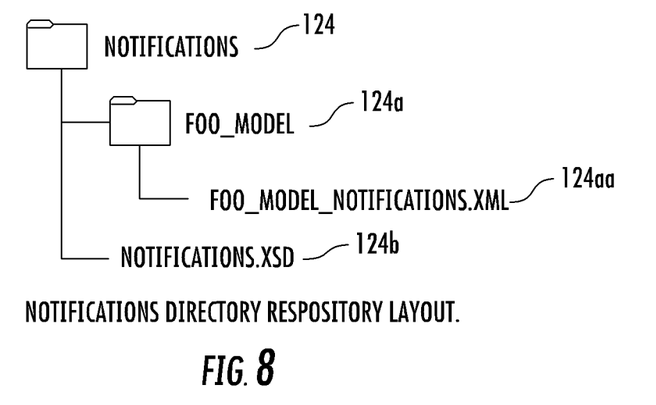
FIG. 8 is a graphic representation of the notifications directory repository layout.

FIG. 3 shows the organization of the multi-model repository 110 in a file tree format. FIGS. 4 through 8 show the layout of the sub-directories of the multi-model repository 110. The DSML models are preferably stored in separate directories under the models data dataset subdirectory 111 of the multi-model repository 110 as shown in FIG. 7.

Figure 4:
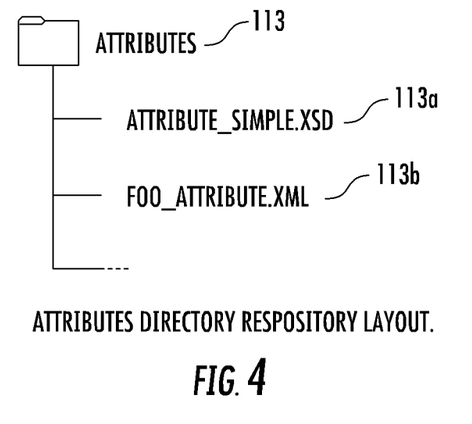
FIG. 4 is a graphic representation of the attributes directory repository layout.
Figure 5:
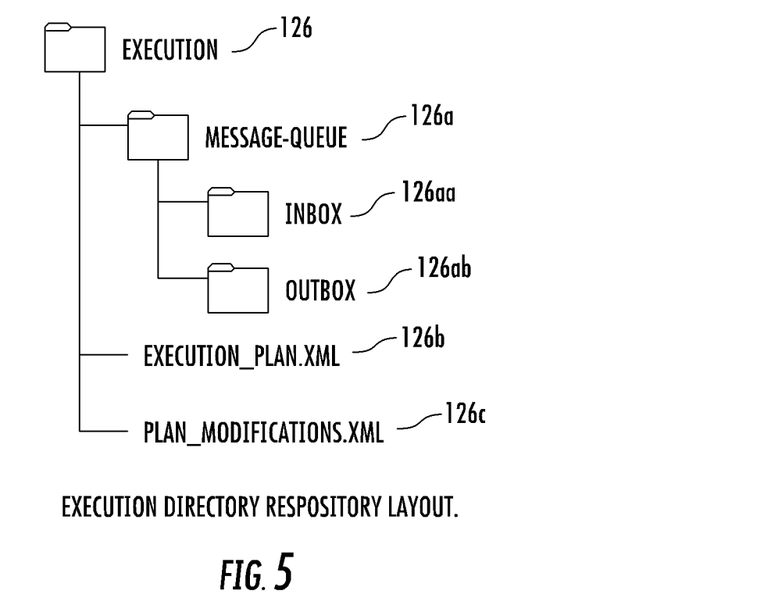
FIG. 5 is a graphic representation of the execution directory repository layout.
Figure 9:
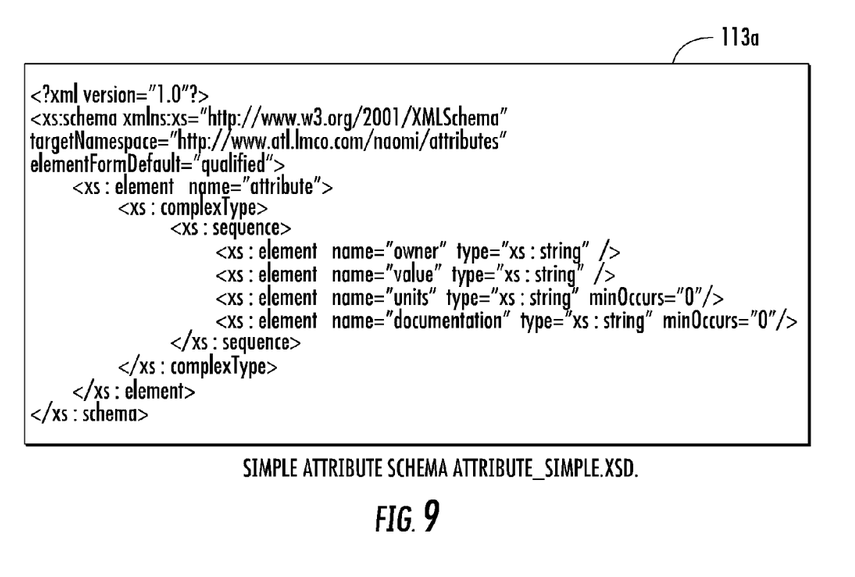
FIG. 9 shows the schema for simple attributes.
Figure 10:
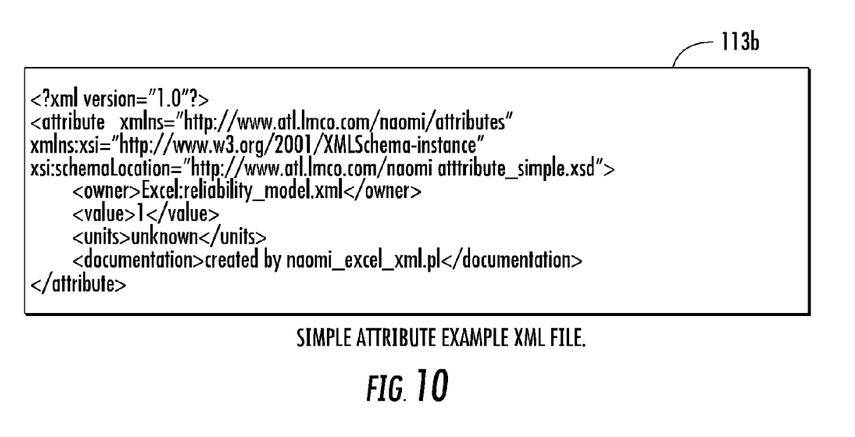
FIG. 10 shows a sample of a simple attribute file in XML format.

Attributes are pieces of data that are shared between the constituent models such as the input and output attributes discussed above. Attributes are saved in XML files 113b in the attributes directory 113 as shown in FIG. 4. Each attribute uses a schema that defines what kind of data it holds. Schema generally refers to a structure of a database system or a data set described in a formal language supported by the database management system. FIG. 9 shows an attribute schema 113a for simple attributes. The attribute schema 113a is required at a minimum to support the concept of ownership and a field that holds the value of the attribute. As discussed earlier, although attributes hold data that is shared between the constituent models, an attribute can only be written by a model that owns it and the attribute schema 113a maintains the ownership information. An example of an attribute file 113b is shown in FIG. 10. Table 1 describes an example of the fields in a minimal attribute file 113b.

TABLE 1

| Field | Required | Description |
| --- | --- | --- |
| owner | yes | Model that created the attribute |
| value | yes | Value of the attribute |
| units | no | Units of the attribute |
| documentation | no | Description of the attribute |

There is no inherent restriction on the types of data an attribute can hold. Custom attribute types can be defined with their own schemas, and as long as connectors that read and write them can understand those schemas. This implies that attributes could hold compound values that contained attributes owned by foreign models. If this is the case, then the attribute schema should be rich enough to also contain the first level dependencies of the attribute. For example, if an attribute contains an entire UML diagram, then any embedded attributes read by the owning model (connector) should be included as dependencies.

Figure 11:
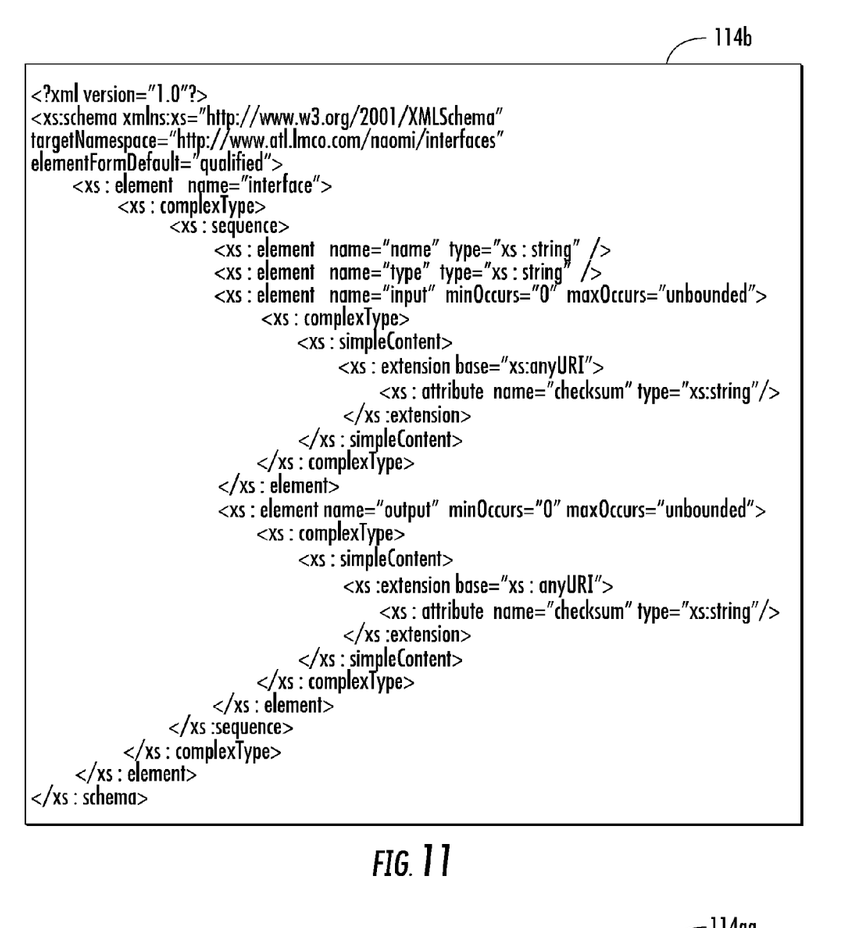
FIG. 11 shows the schema for model interfaces.
Figure 12:
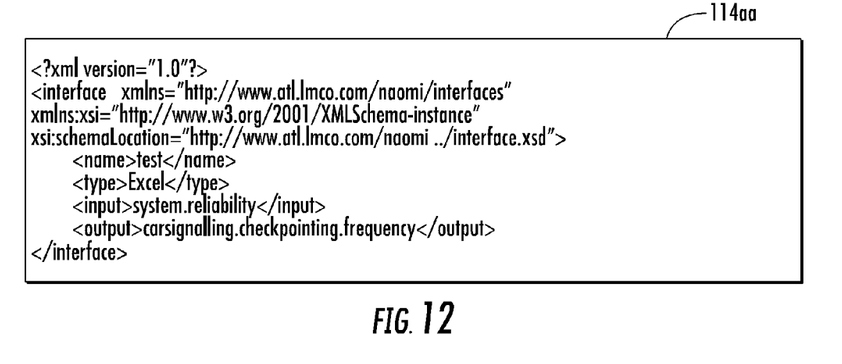
FIG. 12 shows a sample of XML interface file.

Following our basic premise of treating each model as a black box with its own input and output attributes, each model has an interface file that describes which attributes are inputs to the model and which are outputs. FIG. 11 shows the schema 114b for model interfaces. The interface schema 114b is kept in a file named "interface.xsd" in the interfaces dataset directory 114, as shown in FIG. 6. An example XML interface file 114aa is shown in FIG. 12. The XML interface file 114*aa* is for an Excel model named "test" that reads the "system.reliability" attribute and writes the "carsignalling.checkpointing.frequency" attribute.

Separate directories are kept for each model interface. These directories can optionally hold private XML schemas that may be used to further validate the contents of attribute files. For example, if the interfaces/test directory held a file named "foo.xsd", then the test connector could validate the "foo" attribute when reading it. The schema could check for attribute values that are out of bounds for the test model, even though the values were valid for other models.

The models registry dataset file 112 maintains a list of models participating in a multi-model database. This file 111*b* is located in the models dataset subdirectory 111 along with the schema 111*c*.

Figure 13:
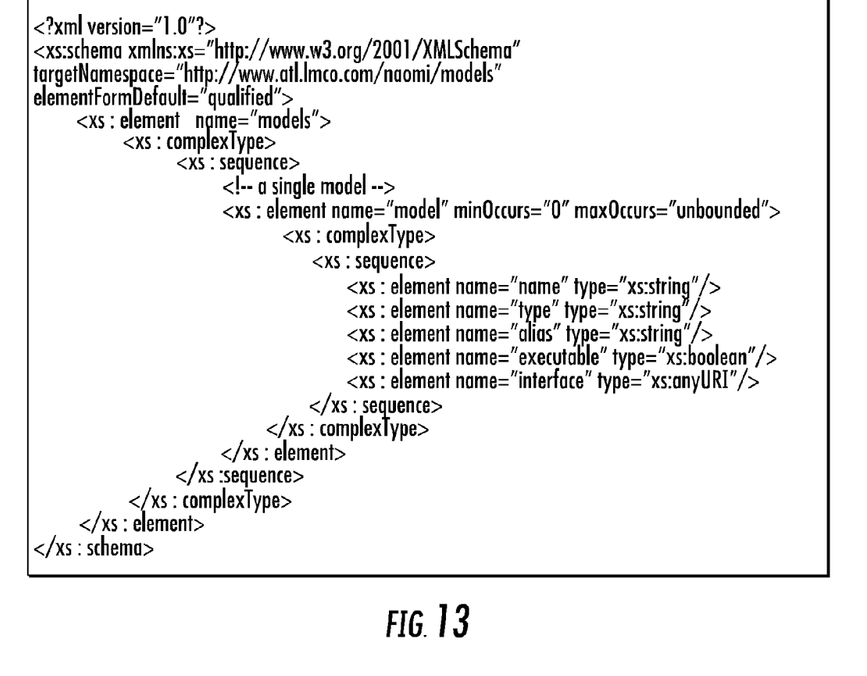
FIG. 13 shows the schema for the model registry.
Figure 14:
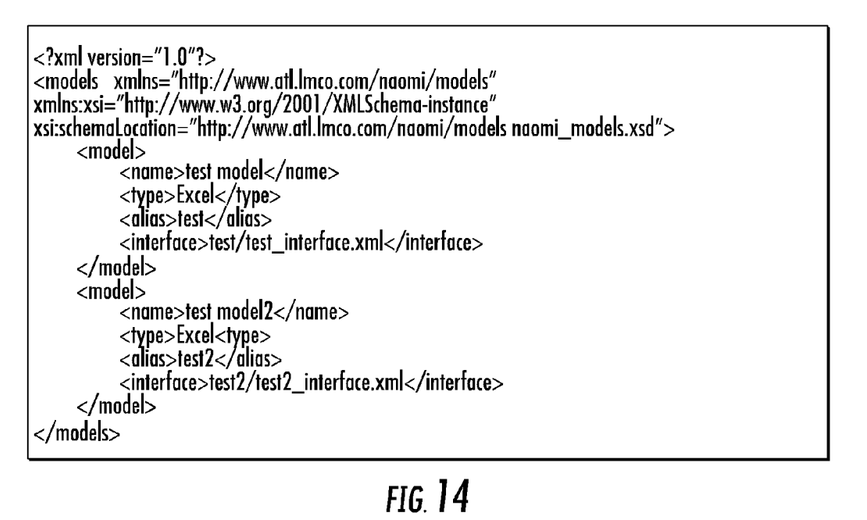
FIG. 14 shows an example of XML model registry file.

FIG. 13 and FIG. 14 show the representative schema and a corresponding sample of the model registry dataset file 112. The model registry dataset file 112 maintains information of each model. Examples of elements in the model registry file include the name, type and aliases of the model, whether or not it is executable, and a reference to the interfaces file. In the illustrated example, the model registry file contains information on two Excel models named "test model" and "test model2."

Referring back to FIG. 1, the remote client-side components 200 implemented on one or more remote client computers $10_{(1)} \ldots 10_{(n)}$ comprise a multi-model manager 11, connectors 12, execution automation engine 13, sandbox 15, and version control system client 19. Utilizing the multi-model integration platform P, the modelers m edit models in DSMLs and use the multi-model manager 11 to construct the multi-model for a system from individual constituent models. The connectors 12 isolate DSML specific interface codes and interact with the multi-model manager 11 and the sandbox 15. The sandbox 15 provides the modelers m with a local copy of the multi-model repository 110 that holds the multi-model's artifacts (described above) under version control. The execution automation engine 13 determines an ordering of execution based on dependencies in the multi-model and orchestrates execution of the multi-model.

The connectors 12 are software components that connect individual models to the multi-model. They allow controlled information exchange between models. A primary design goal of the multi-modeling integration platform P is to have simple, lightweight connectors, enabling the easy integration of new modeling languages and tools. Connectors 12 are language and tool specific, but may be used for multiple tools if the tools provide equivalent interfaces to the connector. Connectors 12 preferably provide the following: (1) a mechanism for reading attributes from local copies of attribute files and inserting the attribute contents in the appropriate model files; (2) a mechanism for extracting attributes from models and writing those attributes to local files; (3) a mechanism for writing an interface description. This capability ensures that the interface always reflects the actual inputs and outputs of the model; (4) a connector-independent, common mechanism to ensure that the multi-modeling integration platform P can always determine when the value of an attribute has changed. The connectors 12 can be implemented in any language. For example, an Excel connector can be written in Perl, and a UML connector can be written in Java. The integration mechanism is specific to the connector, and connector writers may implement the mechanism any way they choose. For example, an Excel connector might expect that Excel models are integrated by naming cells in a special way (e.g., a cell named naomi-get.system.reliability can instruct the Excel connector to retrieve the system.reliability attribute and place it in the cell).

The multi-model manager 11 is the component responsible for assisting modelers m in integrating and invoking connectors 12, performing consistency checks, performing constraint checks, and generating automatic notifications 124. Messages are generated when constraints are violated. Additionally, the multi-model manager 11 allows modelers to visualize the multi-model repository 110 and obtain an overall view of the multi-model.

In one example of the implementation of the multi-modeling integration platform P, the multi-model manager 11 can be implemented as a Netbeans rich client to be used locally on modelers' machines, the remote client computers $10_{(1)} \ldots 10_{(n)}$ to assist them in managing their sandboxes 15. The multi-model manager 11 automatically handles the sending and receiving of notifications and provides facilities for control of the multi-model repository 110. Additionally, the multi-model manager 11 works in conjunction with the execution automation engine 13 to provide work flow management during model execution.

The execution automation engine 13 facilitates the generation of a workflow for integrated DSML models in the context of a multi-modeling system platform project. The execution automation engine 13 is the component responsible for determining an order for the execution of individual models in the multi-model. This is obtained through analysis of the artifacts in the multi-model repository 110. The execution automation engine 13 uses this ordering to orchestrate the execution process which propagates dependencies. When execution of a project is requested to resolve dependencies, execution automation engine 13 branches the project using the version control system, queries the model registry dataset 112 for all registered models, and builds a dependency graph based on each model's inputs and outputs. A plan of execution, based on these dependencies, is stored in the multi-model repository 110. This plan is updated as execution progresses, and it allows modelers to examine the status of the multi-model's execution. Execution automation engine 13 interacts with multi-model manager 11 to request the execution of each model until a consistent state is reached.

The multi-model database 100 of the present disclosure provides a sandbox feature so that the modelers can interact with the multi-model repository 110 through local copies of the multi-model repository 110 maintained in the sandboxes 15 in their corresponding remote client computer $10_{(n)}$. Because there can be a plurality of modelers concurrently working on and modifying different constituent models in the multi-model system, sandboxes 15 allow modelers to work on local copies of their constituent models without being affected by concurrent changes to the multi-model from other modelers. To interact with a project, modelers checkout local copies of the multi-model repository 110 and make modifications. The modifications made by each of the modelers are communicated to other models that may be dependent on the modified model by synchronization with the actual central multi-model repository 110.

The concept of the sandbox, sometimes also called a working directory, a test server or a development server, is typically built into version control software such as CVS and Subversion, in which developers "check out" a copy of the source code tree, or a branch thereof, to examine and work on. A sandbox provides a testing environment that isolates untested code changes and outright experimentation from the production environment or repository, in the context of software development and revision control. Sandboxing protects "live" servers and their data, vetted source code distributions, and other collections of code, data and/or content, proprietary or public, from changes that could be damaging to a mission-critical system or which could simply be difficult to revert. Sandboxes replicate at least the minimal functionality needed to accurately test the programs or other code under development (e.g. usage of the same environment variables as, or access to an identical database to that used by, the stable prior implementation intended to be modified). There are many other possibilities, as the specific functionality needs vary widely with the nature of the code and the application[s] for which it is intended. Generally, the changes made to a model should be checked back into and merged with the multi-model repository 110 and made available to other developers or end users of the software only after the developer has fully tested the code changes in their own sandbox.

The functionalities provided by the remote client-side components 200 includes, model data exchange, model execution, change propagation, consistency management and version management. Data Exchange: Data exchange between constituent models is accomplished via the attributes dataset 113. The owner of an attribute writes the attribute and commits it to the multi-model repository 110. Readers, who are one or more consumer(s) of the attribute, synchronize their local sandbox 15 with the multi-model repository 110 which accesses the attribute to obtain the data output by the owner model. Model Execution: In the context of the multi-modeling integration platform P, model execution is the process whereby model inputs are read, the model is run, and the outputs are written. It is the combined action of reading the attributes from the attributes dataset 113, running the model (using the model editing tools 122), and writing the output attributes to the multi-model repository 110. For example, execution of an Excel spreadsheet model involves loading the spreadsheet, reading the input attributes from the attributes dataset 113 into the spreadsheet, allowing the calculated cell values to be updated, and writing the output attributes into the attributes dataset 113 of the multi-model repository 110. An underlying assumption is that the models are parametrized, and we distinguish between model edits, which are actual changes to the model, and attribute changes, which are changes to the values of attributes. Change Propagation: When a model is modified, changes are propagated by controlled exchange of attributes between models. A multi-model may be thought of as a pseudo graph, G(V, E) where each model is represented by a vertex, $v_i$, such that $\forall M_i \in M | v_i \in V$. Each edge, (u,v), represents data propagated from an output attribute of one model to the input attribute of another, that is $$\forall (u,v) \in E | \exists M_i(L,I_i,O_i), M_j(L',I_j,O_i) : a_i \in O_i \hat{} a_i \in I_j.$$

This definition admits parallel edges so E must be a multi-set. To propagate changes, we can perform a depth first search on G and select the leaves (which are models that have no dependent models) to be executed first. We propagate changes from the leaves upward with respect to dependencies such that no model $M_i$ is executed before another model $M_j$ if $\exists a_i$: $a_i \in I_i \hat{} a_i \in O_j$.

Even in well designed multi-models it is possible for the pseudo graph G(V,E) to contain strongly connected components. When this occurs, it is not possible to infer the proper execution order of models that participate in cyclic dependency in a strongly connected component. In this case, the execution order of the models is the strongly connected component can be specified manually.

There are cases where the execution order cannot be determined by examining the dependency graph. Some models, particularly nondeterministic models, may need to be executed for a specified number of iterations, or until their attributes meet some predetermined constraints. Also, when the dependency graph has strongly connected components composed of two or more models, we require some way to deal with cycles.

In both of these cases, we require manual input, typically by a knowledgeable user of the domain data, to successfully perform execution. We have provided a feature whereby modelers may enter rules that specify the systems behavior under these circumstances. Rules are of the form R(M)→S, where R is a rule, mapping a match expression (a sequence of models participating in the execution), M, to a set of actions, S, which will be performed when M is encountered in the execution plan.

Consistency Management: In the context of a multi-model, we are interested in whether the composition of the constituent models is consistent. We assume that the individual models are consistent and define the following types of multi-model consistency: (a) Attribute Consistency—All attributes have been updated by their owner model since the last time their owner model's input attributes changed; (b) Constraint Consistency—The current values of all attributes do not violate any model specific constraints; (c) Attribute-Model Consistency—The modification times (time of last model edit) of all models are earlier than the modification times of their output attributes; (d) Multi-Model Consistency—Multi-models that have the properties of attribute consistency, constraint consistency, and attribute-model consistency are defined as Multi-Model consistent.

Attribute consistency indicates that all models have been executed with up-to-date input data. Therefore, there are no unpropagated attribute changes. For a specific version of the multi-model, this consistency property can be ensured by executing the multi-model. However, this assumes that the models are deterministic. We define a deterministic model as a model that always produces the same output for a given set of inputs, in absence of a model edit.

Constraint consistency indicates that the outputs of all of the models in the multi-model fall within acceptable ranges, and by attribute-model consistency we mean that models have not been edited since their outputs have been written. These consistency types are independent of each other, and achieving one does not imply achieving any other.

We believe that a consistent multi-model is coherent and represents a steady state of the multi-model. By steady state, we mean that executing any subset of the models in the multi-model in any order will not result in any changed attributes. Thus modelers can be confident that outputs from any model in the multi-model are reliable provided the models themselves are consistent and have been integrated such that the correct attributes are exchanged. Our notion of consistency in the context of a single model is intended to convey the meaning that the individual model is correct according to its own definition.

Some limitations are inherent in this approach. As previously indicated, the models must be deterministic, and there can be no cyclic dependencies in the multi-models. Also model execution must halt at some point, output must be written, and attributes must have a format that can be understood by models that read it.

The last of the functionalities provided by the remote client-side components 200 is Version management. Version management refers to the version control system keeping all the artifacts under version control and is used to synchronize local sandboxes 15 with the global multi-model repository 110. It provides modelers the capability to modify any version of an individual model or the multi-model as a whole. Changes can be rolled back, and the entire multi-model can be reconstructed at any time.

Figure 15:
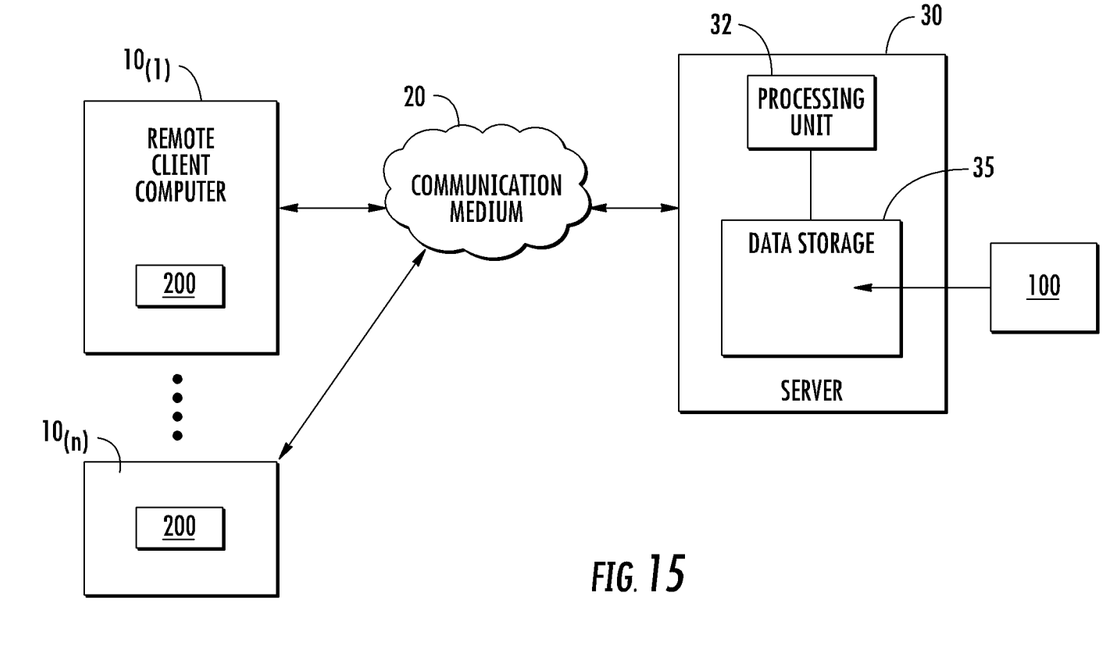
FIG. 15 shows an embodiment of a computer database system employing the multi-model integration platform according to the present disclosure.

FIG. 15 shows an embodiment of a computer database system in which the multi-model database 100 according to the present disclosure is implemented. The computer database system includes one or more remote client computers $10_{(1)} \ldots 10_{(n)}$ connected to a server 30 via a communication medium 20. The communication medium 20 can be a communications link such as the Internet, a local-area or wide-area network (wired or wireless), or other similar communications link that can provide the function of communication link between the server 30 and the one or more remote client computers $10_{(1)} \ldots 10_{(n)}$ for allowing exchange of data.

The server 30 comprises a processing unit 32 and a data storage 35 that is accessible by the processing unit 32. The processing unit 32 executes and coordinates the operation of the server 30 including the communication of data between the server 30 and the one or more remote client computers $10_{(1)} \ldots 10_{(n)}$ and storing data into and accessing the data from the data storage 35. The data storage 35 can be any of the storage devices that are available in the industry such as hard drives, RAM, ROM, or any other appropriate memory devices for storing large quantity of data. In this embodiment, the multi-model database 100 is stored in the data storage unit 32. The contents and structure of the multi-model database 100 is as described above. The remote client-side components 200 are maintained in each of the remote client computers $10_{(1)} \ldots 10_{(n)}$.

The server 30 and the one or more remote client computers $10_{(1)} \ldots 10_{(n)}$ typically includes other common components of a computer, such as a display, user interface devices (e.g. mouse, keyboard, touch-screen interface), etc., that are not explicitly shown here for sake of simplicity because they are well known to one of ordinary skill in the art.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer database system for multi-model integration comprising:
   one or more remote client computers, each having remote client-side components provided therein, said remote client-side components comprising:
      a multi-model manager adapted to construct a system model from a plurality of constituent models, the plurality of constituent models created from a plurality of domain-specific modeling languages;
      one or more connectors providing an interface between the system model and each of the plurality of constituent models;
      an execution automation engine;
      a sandbox comprising a local copy of the system model on the remote client computer; and
      a version control system client; and
   a server connected to the one or more remote client computers via a communication medium, the server comprising:
      a processing unit; and
      a data storage for storing a multi-model database of a product system and accessible by the processing unit, said multi-model database comprising:
         a plurality of artifacts that define the multi-model database; and
         a multi-model repository that holds said artifacts under version control, wherein said artifacts comprise:
            a models data dataset, wherein each model represents a discrete aspect of the product system;
            a model registry dataset containing a list of the models in the multi-model database;
            a model attributes dataset corresponding to each of the models;
            a model interfaces dataset representing a tuple corresponding to each of the models, wherein said tuple contains a mapping operation and said model attributes;
            a model attribute constraints dataset associated with the input and output attributes, wherein said attribute constraints are triggers on the value of the associated attribute;
            a model data editing tools dataset;
            a notifications dataset associated with each of the models for informing the models of defined events; and
            a multi-model execution control dataset.

2. The computer database system of claim 1, wherein the multi-model repository incorporates version control system operations.

3. The computer database system of claim 1, wherein each of the model attributes is owned by one of the plurality of models and the attributes can only be written by the model that owns it.

4. The computer database system of claim 3, wherein the model attributes comprise input attributes and output attributes.

5. A computer database system for multi-model integration comprising:
   one or more remote client computers, each having remote client-side components provided therein, said remote client-side components comprising:
      a multi-model manager for constructing a multi-model for a system from individual constituent models created in a diverse set of domain-specific modeling languages (DSMLs);
      one or more connectors for providing interaction between the multi-model manager and each model's DSML interface;
      an execution automation engine;
      a sandbox for providing a local copy of a multi-model repository; and
      a version control system client; and
   a server connected to the one or more remote client computers via a communication medium, the server comprising:
      a processing unit; and
      a data storage for storing a multi-model database of a product system and accessible by the processing unit, said multi-model database comprising:
         a plurality of artifacts that define the multi-model database; and
         a multi-model repository that holds said artifacts under version control, wherein said artifacts comprise:
            a models data dataset, wherein each model represents a discrete aspect of the product system;
            a model registry dataset containing a list of the models in the multi-model database;
            a model attributes dataset corresponding to each of the models;

a model interfaces dataset representing a tuple corresponding to each of the models, wherein said tuple contains a mapping operation and said model attributes;

a model attribute constraints dataset associated with the input and output attributes, wherein said attribute constraints are triggers on the value of the associated attribute;

a model data editing tools dataset;

a notifications dataset associated with each of the models for informing the models of defined events; and a multi-model execution control dataset.

6. The computer database system of claim 5, wherein the multi-model repository incorporates version control system operations.

7. The computer database system of claim 5, wherein each of the model attributes is owned by one of the plurality of models and the attributes can only be written by the model that owns it.

8. The computer database system of claim 7, wherein the model attributes comprise input attributes and output attributes.

\* \* \* \* \*